US012594589B2

(12) United States Patent
Hashimoto

(10) Patent No.: US 12,594,589 B2
(45) Date of Patent: Apr. 7, 2026

(54) METHOD FOR WASHING GAS SUPPLY PART IN GAS INSPECTION APPARATUS

(71) Applicant: SHIMADZU CORPORATION, Kyoto (JP)

(72) Inventor: Akara Hashimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 541 days.

(21) Appl. No.: 17/428,335

(22) PCT Filed: Sep. 10, 2019

(86) PCT No.: PCT/JP2019/035479
§ 371 (c)(1),
(2) Date: Aug. 4, 2021

(87) PCT Pub. No.: WO2020/174729
PCT Pub. Date: Sep. 3, 2020

(65) Prior Publication Data
US 2022/0118487 A1 Apr. 21, 2022

(30) Foreign Application Priority Data

Feb. 25, 2019 (JP) ................................. 2019-031369

(51) Int. Cl.
*G01N 1/22* (2006.01)
*B08B 9/032* (2006.01)
*B08B 9/035* (2006.01)

(52) U.S. Cl.
CPC ............ *B08B 9/0328* (2013.01); *B08B 9/035* (2013.01); *G01N 1/22* (2013.01)

(58) Field of Classification Search
CPC ........ B08B 9/035; B08B 9/0328; G01N 1/22; G01N 33/0011; G01N 35/1095; G01N 35/1004
See application file for complete search history.

(56) References Cited

U.S. PATENT DOCUMENTS

| | | | |
|---|---|---|---|
| 6,374,662 B1 * | 4/2002 | Oda | ................... G01N 35/1097 |
| | | | 422/612 |
| 2013/0179089 A1 | 7/2013 | Kita et al. | |
| 2017/0107980 A1 | 4/2017 | Liu | |

FOREIGN PATENT DOCUMENTS

| | | | | |
|---|---|---|---|---|
| JP | H04174647 | A | * | 6/1992 |
| JP | 2540169 | | * | 7/1997 |
| JP | 10-274644 | A | | 10/1998 |
| JP | 3126648 | U | * | 11/2006 |

(Continued)

OTHER PUBLICATIONS

JP3126648U Written Description (Year: 2006).*

(Continued)

*Primary Examiner* — Kaj K Olsen
*Assistant Examiner* — Ryan L Coleman
(74) *Attorney, Agent, or Firm* — Sughrue Mion, PLLC

(57) ABSTRACT

A method for cleaning a gas supply unit of a gas inspection apparatus, the gas supply unit (8) being configured to supply a sample gas from supply ports (P01 to P12) to an inspection unit via a supply path, the method including connecting a bag container in which nitrogen gas is sealed to each of the supply ports (P01 to P12), and depressurizing the supply path for a predetermined period of time.

2 Claims, 4 Drawing Sheets

(56) References Cited

FOREIGN PATENT DOCUMENTS

| | | | |
|---|---|---|---|
| JP | 2017-532472 | A | 11/2017 |
| WO | 2012/004861 | A1 | 1/2012 |

OTHER PUBLICATIONS

JP H04174647 A Written Description (Year: 1992).*
Translation of JP2540169 by Noda, published Jul. 2, 1997.*
Translation of JPH10274644 by Gomi, published Oct. 13, 1998.*
Chinese Office Action dated Dec. 22, 2023 in Chinese Application No. 201980092902.3.
Written Opinion for PCT/JP2019/035479 dated Dec. 3, 2019 [PCT/ISA/237].
Communication dated Aug. 9, 2022 from the Japanese Patent Office in Application No. 2021-501538.
Notice of Allowance issued Mar. 14, 2023 in Japanese Application No. 2021-501538.
Office Action issued May 24, 2024 in Chinese Application No. 201980092902.3.
Communication dated Oct. 17, 2024 in Chinese Application No. 201980092902.3.

* cited by examiner

METHOD FOR WASHING GAS SUPPLY PART IN GAS INSPECTION APPARATUS

TECHNICAL FIELD

The present invention relates to a method for cleaning a gas supply unit of a gas inspection apparatus.

BACKGROUND ART

An odor identification apparatus for evaluating odors of various substances is a form of a gas inspection apparatus. The odor identification apparatus is configured such that sample gas of various types is supplied from a gas supply unit to an inspection unit, detection signals are generated by a plurality of odor sensors having different response characteristics in the inspection unit, and the odor is evaluated by analyzing the detection signals (see Patent Literature 1).

In this odor identification apparatus, a gas supply unit, which is also referred to as an automatic gas sampler, is used as a supply unit for supplying a sample gas to the inspection unit. The gas supply unit has a plurality of supply ports, to each of which a bag container (which is also referred to as a sample bag) in which a sample gas is sealed is connected, and supplies a sample gas from one of the supply ports to the inspection unit via a supply path.

CITATION LIST

Patent Literature

Patent Literature 1: WO 2012/004861 A

SUMMARY OF INVENTION

Technical Problem

In an odor identification apparatus, variation in measured results may occur even when odor evaluation is performed under the same condition. The inventor of the present invention has found that the variation is due to a slight amount of sample gas remaining in a supply port or the like of the gas supply unit after the previous measurement of the sample gas, and that this remnant of the sample gas is due to insufficient cleaning of the gas supply unit.

To prevent occurrence of such a state, the gas supply unit needs to be sufficiently cleaned. To clean the gas supply unit, a method as follows may be employed. A supply port for supplying gas from the gas supply unit to the inspection unit is connected to a discharge pump or the like, and the gas that has been suctioned from the supply port is discharged via a supply path to the outside. However, cleaning by this cleaning method requires a long time. Actually, such a cleaning may take a few days or several weeks, depending on a state of contamination in the gas supply unit.

The present invention is made to solve the problem described above. An object of the present invention is to provide such a method for cleaning a gas supply unit of a gas inspection apparatus that can bring the gas supply unit into a clean state in a short time.

Solution to Problem

The present invention provides a method for cleaning a gas supply unit of a gas inspection apparatus, the gas supply unit being configured to supply a sample gas from a supply port to an inspection unit via a supply path, the method including closing the supply port and depressurizing the supply path.

Advantageous Effects of Invention

According to the present invention, the gas supply unit can be brought into a clean state in a short time by depressurizing the supply path while the supply port is closed.

DESCRIPTION OF EMBODIMENTS

Figure 1:
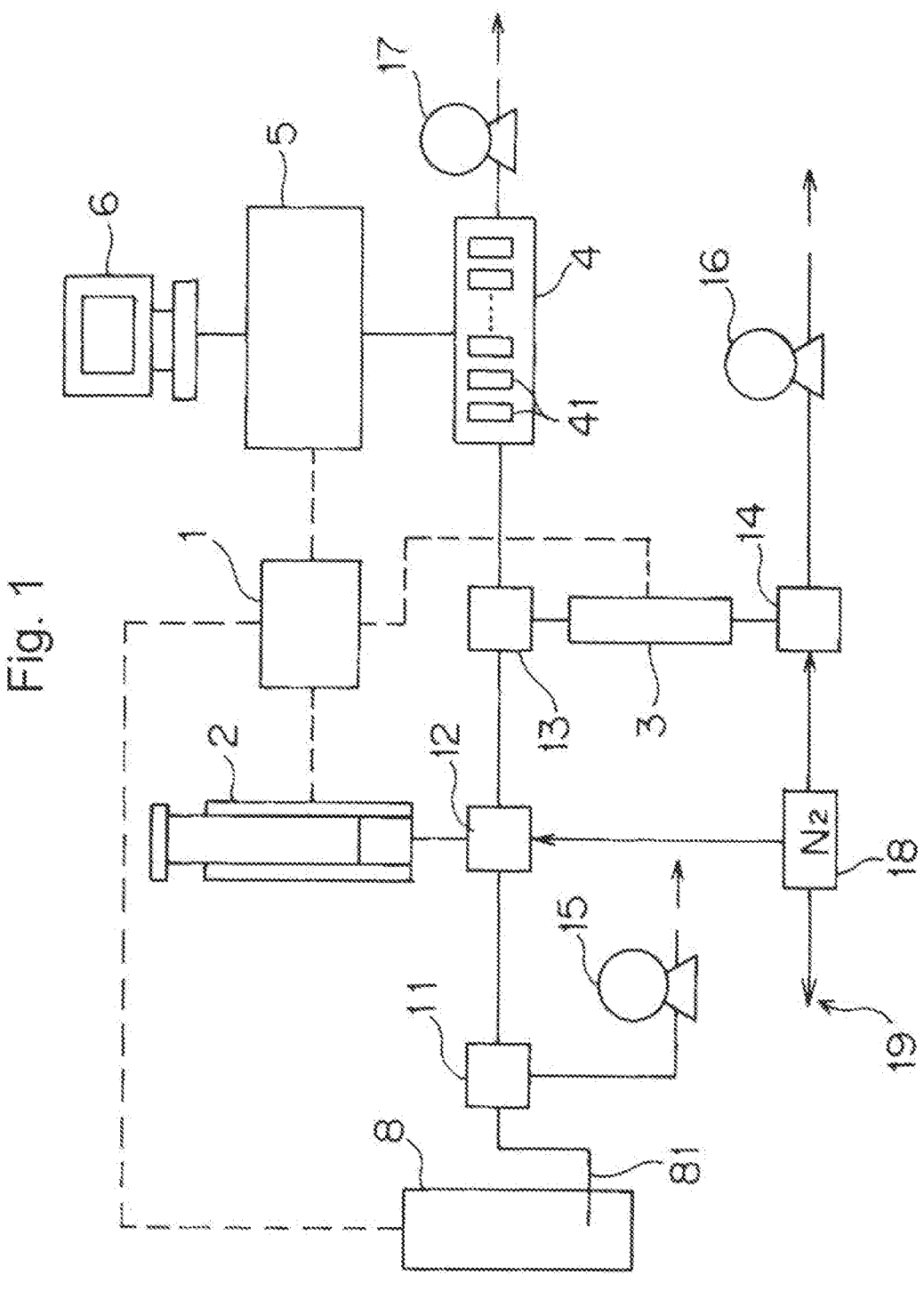
FIG. 1 is a schematic configuration diagram of an odor identification apparatus as a gas inspection apparatus according to an embodiment of the present invention.

Hereinafter, embodiments of the present invention will be described with reference to the drawings. First, a configuration of a gas inspection apparatus according to an embodiment of the present invention will be described. FIG. 1 is a schematic configuration diagram of an odor identification apparatus as a gas inspection apparatus according to an embodiment of the present invention.

The odor identification apparatus is for evaluating odors (smells, aromas, etc.) of various substances, and includes a gas supply unit 8 for supplying a sample gas, a dilution unit 2 for diluting the sample gas supplied from the gas supply unit 8, an enrichment unit 3 for removing moisture in the gas diluted by the dilution unit 2 and selectively enriching the substance, a sensor cell 4 including a plurality of odor sensors 41, a signal processing unit 5 that performs analysis based on a detection signal detected by the sensor cell 4, an operation unit 6 configured from a personal computer or the like to input various pieces of data and display an analysis result given by the signal processing unit 5, and a control unit 1 that totally controls the apparatus. Note that, the dilution unit 2, the enrichment unit 3, the sensor cell 4, and the signal processing unit 5 constitute an inspection unit according to the present invention.

A plurality of electromagnetic switching valves 11, 12, 13, and 14 are disposed on the gas supply path of the odor identification apparatus. The electromagnetic switching valve 11 is connected to a discharge pump 15, and the electromagnetic switching valve 14 is connected to a discharge pump 16. The sensor cell 4 is connected to a discharge pump 17. The electromagnetic switching valve 12 and the electromagnetic switching valve 14 are connected to a nitrogen gas supply unit 18.

To perform odor identification, the electromagnetic switching valves 11 and 12 are switched to connect the gas supply unit 8 and the dilution unit 2 with each other. The sample gas is sent from the gas supply unit 8 to the dilution unit 2 by the action of a syringe in the dilution unit 2. Then, the electromagnetic switching valves 11 and 12 are switched to connect the nitrogen gas supply unit 18 and the dilution unit 2 with each other. By the action of the syringe in the dilution unit 2, the nitrogen gas is sent from the nitrogen gas supply unit 18 to the dilution unit 2, whereby the sample gas is diluted. When the sample gas needs not be diluted, the nitrogen gas is not supplied.

The electromagnetic switching valves 12 and 13 are switched to connect the dilution unit 2 and the enrichment unit 3 with each other. Then, the electromagnetic switching valve 14 is switched to cause the sample gas to pass through a collection tube of the enrichment unit 3 by the action of the discharge pump 16, whereby components of the sample gas are adsorbed onto the adsorbent in the collection tube of the enrichment unit 3. Thereafter, the electromagnetic switching valves 13 and 14 are switched to connect the nitrogen gas supply unit 18, the gas supply unit 8, and the enrichment unit 3 with each other, and to connect the enrichment unit 3 and the sensor cell 4 with each other. In this state, the temperature of the collection tube of the enrichment unit 3 is rapidly raised, and the nitrogen gas supplied from the nitrogen gas supply unit 18 is made to flow toward the sensor cell 4. This causes the odor components that have been adsorbed onto the adsorbent in the collection tube of the enrichment unit 3 to be separated from the adsorbent, and introduced into the sensor cell 4 along with the nitrogen gas flow. In the enrichment unit 3, the enrichment rate can be adjusted by flow rates of the supplied sample gas and nitrogen gas. When enrichment is not necessary, the operation described above is not performed.

By the action of the discharge pump 17, the enriched gas is introduced into the sensor cell 4 to cause the components of the gas to come into contact with a plurality of odor sensors 41, and different detection signals are output from the respective odor sensors 41. The detection signals are transmitted to the signal processing unit 5 and analyzed by the signal processing unit 5. Analyzed data is transmitted from the signal processing unit 5 to the operation unit 6, and measurement data is displayed on a display device of the operation unit 6.

Figure 2:
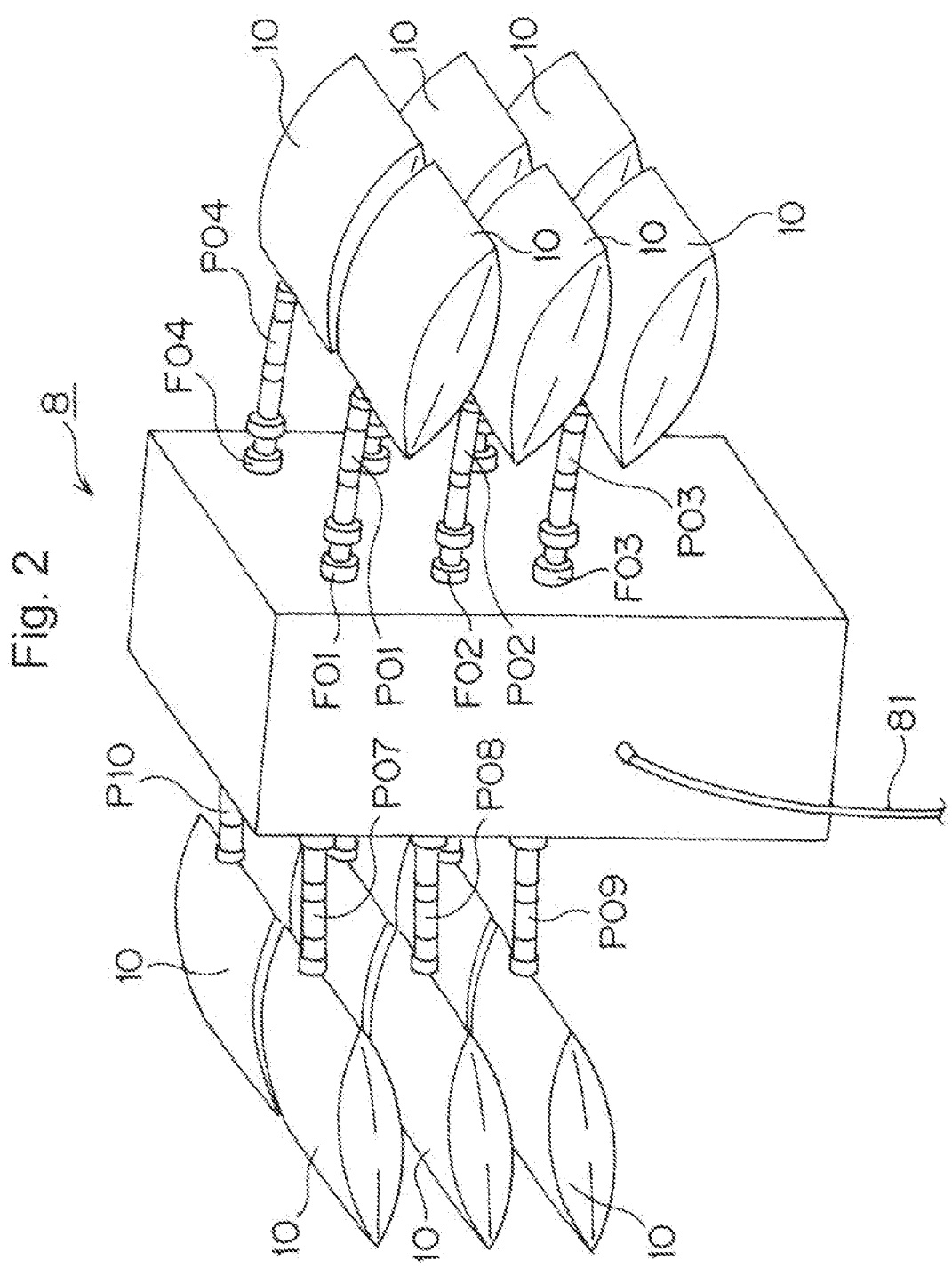
FIG. 2 is a perspective view of a gas supply unit 8.
Figure 3:
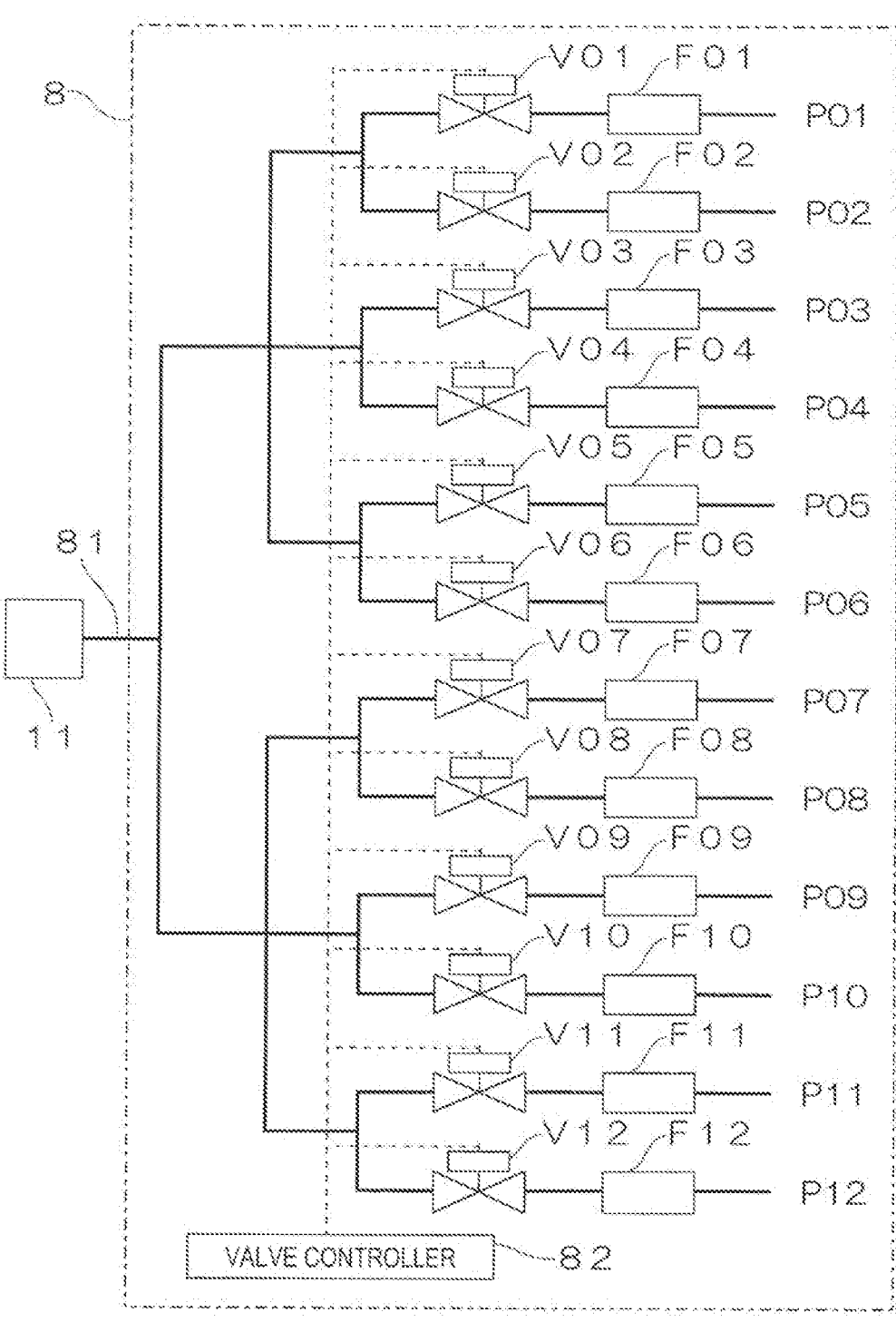
FIG. 3 is a flow path diagram illustrating a gas supply path of the gas supply unit 8.

Now, a configuration of the gas supply unit 8 of the odor identification apparatus will be described. FIG. 2 is a perspective view of the gas supply unit 8. FIG. 3 is a flow path diagram illustrating a gas supply path of the gas supply unit 8.

The gas supply unit 8 is also referred to as an automatic gas sampler, and includes 12 supply ports P01 to P12 to each of which a bag container 10 (which is also referred to as a sample bag) in which a sample gas is sealed is connected. The supply ports P01 to P12 are connected to a pipe 81 respectively via the filters F01 to F12 and the electromagnetic on-off valves V01 to V12. Each of the electromagnetic on-off valves V01 to V12 is connected to a valve controller 82 that receives a control signal from the control unit 1 illustrated in FIG. 1. Each of the electromagnetic on-off valves V01 to V12 performs an opening/closing operation according to a command from the valve controller 82. The "bag container" in this description has a bag-like shape in which gas can be sealed, and is equivalent to, for example, an "odor bag" defined in the Offensive Odor Control Act.

To perform odor identification in the odor identification apparatus, a sample gas is sealed in the bag container 10. Under the control of the valve controller 82 that has received a signal from the control unit 1, the electromagnetic on-off valves V01 to V12 are sequentially opened, and the sample gas in each bag container 10 is sent to the inspection unit including the dilution unit 2, the enrichment unit 3, the sensor cell 4, and the signal processing unit 5.

The gas supply unit 8, after a predetermined inspection has been performed, is contaminated with the sample gas. In particular, components contained in the sample gas remain on the connectors or the like, made of a fluororesin material, of the supply ports P01 to P12. Performing odor identification in such a state may cause variation in the result of identification. Thus, the gas supply unit 8 needs to be cleaned regularly.

Figure 4:
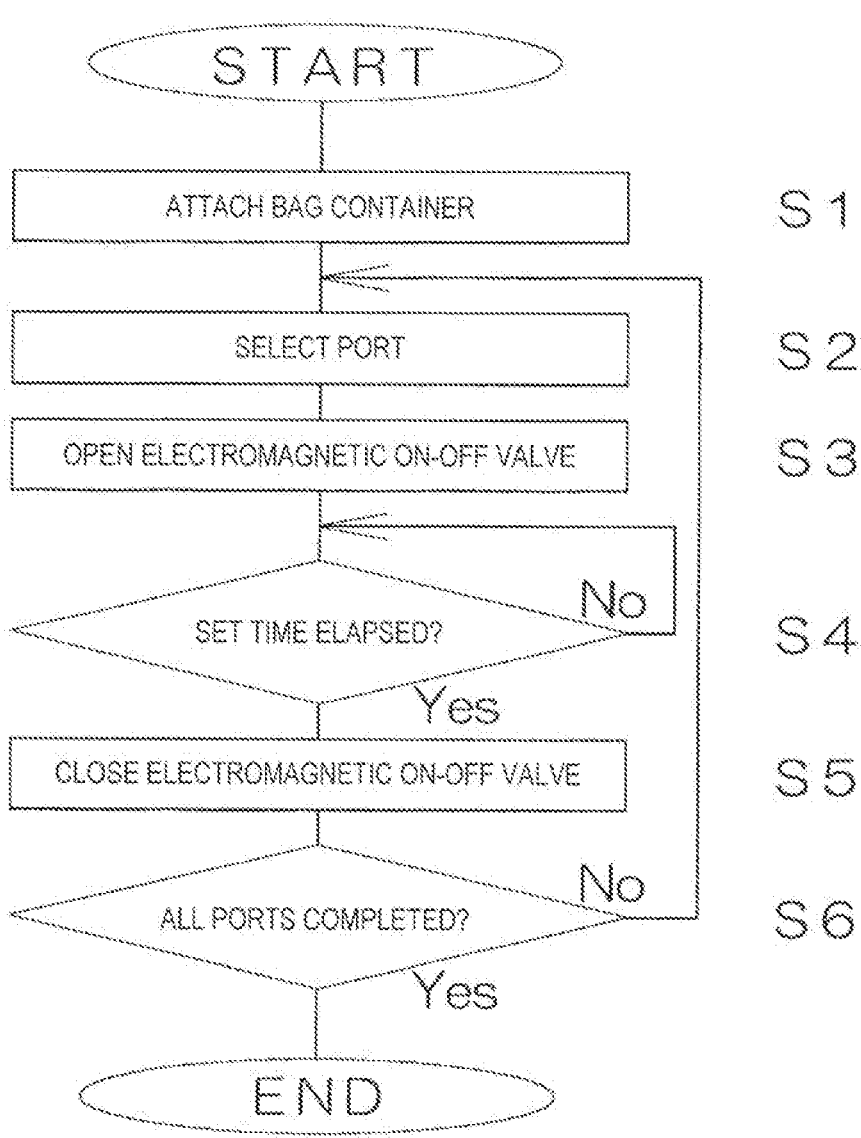
FIG. 4 is a flowchart illustrating a cleaning step for the gas supply unit 8.

FIG. 4 is a flowchart illustrating a cleaning step for the gas supply unit 8.

To clean the gas supply unit 8, first, the bag container 10 in which nitrogen gas is sealed is connected to each of the supply ports P01 to P12 (step S1). Sample gas is sealed in the bag container 10 to perform odor identification, whereas nitrogen gas is sealed in the bag container 10 to clean the gas supply unit 8. To seal nitrogen gas in the bag container 10, one of supply interfaces 19 of the nitrogen gas supply unit 18 illustrated in FIG. 1 is connected to the bag container 10. Thereby, clean nitrogen gas of, for example, about 2 liters is sealed in the bag container 10.

The pipe 81 and the discharge pump 15 are connected with each other by switching the electromagnetic switching valve 11, and the discharge pump 15 starts a discharge operation. Note that, the pipe 81 and the discharge pump 15 may directly be connected with each other, without using the electromagnetic switching valve 11.

When the preparation described above is done, one of the supply ports P01 to P12 (for example, the supply port P01) is selected (step S2). The corresponding electromagnetic on-off valve V01 is opened (step S3). The nitrogen gas sealed in the bag container 10 is suctioned by the action of the discharge pump 15. Wait until the time elapses for a set time (step S4). The set time is, for example, about five minutes.

The nitrogen gas in the bag container 10 is suctioned in this set time. By this suctioning, the gas supply path from the supply port P01 to the pipe 81 through the filter F01 is cleaned by the nitrogen gas. By continuing the suctioning until the nitrogen gas is completely suctioned out of the bag container 10, the gas supply path from the supply port P01 to the pipe 81 is depressurized. With this depressurization, the odor components that have remained on the inside of the gas supply path, such as a portion, connected to the bag container 10, of the supply port P01 volatilizes to be discharged to the outside. The gas supply path is thereby brought into a clean state.

When the set time has elapsed (step S4), the electromagnetic on-off valve V01 is closed (step S5). The next supply port (for example, the supply port P02) is selected (step S2). This operation is repeated until all the supply ports P01 to P12 are cleaned (step S6).

In the embodiment described above, the nitrogen gas is sealed in the bag container 10. However, a clean gas other than nitrogen gas may be sealed in the bag container 10. Nevertheless, since the odor identification apparatus is generally used together with the nitrogen gas supply unit 18, it is most simple, easy, and inexpensive to use nitrogen gas.

In the embodiment described above, the bag container 10 in which the nitrogen gas is sealed is connected to each of the supply ports P01 to P12, and then the gas supply path is depressurized by the discharge pump 15. However, the gas supply path may be depressurized, without using the bag container 10, after each of the supply ports P01 to P12 is closed by a closing member or the like. Nevertheless, the gas supply unit 8 can be cleaned further effectively by suctioning the nitrogen gas sealed in the bag container 10, that is, the gas supply path is cleaned with the nitrogen gas and then depressurized.

In the embodiment described above, the gas supply path is depressurized using the dedicated discharge pump 15. However, the gas supply path may be depressurized using the discharge pump 16 or the discharge pump 17.

In the embodiment described above, the present invention is applied to an odor identification apparatus for evaluating odors of various substances. However, the present invention may be applied to a gas inspection apparatus other than the odor identification apparatus.

Those skilled in the art may understand that the exemplary embodiment described above is a specific example of the following aspects.

A method for cleaning a gas supply unit of a gas inspection apparatus according to a first aspect of the present invention is a method for cleaning a gas supply unit of a gas inspection apparatus, the gas supply unit being configured to supply a sample gas from a supply port to an inspection unit via a supply path, the method including closing the supply port and depressurizing the supply path.

According to the method for cleaning a gas supply unit of a gas inspection apparatus according to the first aspect of the present invention, the gas supply unit can be brought into a clean state in a short time.

In a method for cleaning a gas supply unit of a gas inspection apparatus according to an exemplary modification of the first aspect of the present invention, a bag container in which a clean gas is sealed is connected to the supply port, and then the supply path is depressurized for a predetermined period of time.

According to this aspect, in which the supply path is cleaned with the clean gas and then depressurized, the gas supply unit can be brought into a clean state in a further shorter time.

In a method for cleaning a gas supply unit of a gas inspection apparatus according to another exemplary modification of the first aspect of the present invention, the gas sealed in the bag container is nitrogen gas.

According to this aspect, in which the nitrogen gas generally used in the gas inspection apparatus is used, a clean gas is sealed in the bag container by the simplest and easiest way.

Note that, the above description is for explaining the embodiment of the present invention, and is not for limiting the scope of the present invention.

REFERENCE SIGNS LIST

1 . . . Control Unit
2 . . . Dilution Unit

3 . . . Enrichment Unit
4 . . . Sensor Cell
5 . . . Signal Processing Unit
6 . . . Operation Unit
10 . . . Bag Container
15 . . . Discharge Pump
82 . . . Valve Controller
P01 to P12 . . . Supply Port
V01 to V12 . . . Electromagnetic On-off Valve

The invention claimed is:

1. A method for cleaning a gas supply unit of a gas inspection apparatus, the gas supply unit comprising a plurality of supply paths and a plurality of supply ports, wherein each supply path is configured to channel gas from a corresponding supply port of the plurality of supply ports to an inspection unit, the method comprising steps of:

connecting a plurality of sample-gas bag containers to the plurality of supply ports such that each sample-gas container of the plurality of sample-gas bag containers is connected to a corresponding supply port of the plurality of supply ports, wherein each sample-gas bag container contains its own sample gas sealed therein such that a plurality of sample gases is contained in the plurality of sample-gas bag containers;

supplying each sample gas sealed in the sample-gas bag containers sequentially from the plurality of supply ports to the inspection unit, to perform a gas inspection;

after the gas inspection is performed, replacing the plurality of sample-gas bag containers with a plurality of cleaning-gas bag containers in which a cleaning gas is sealed such that each cleaning-gas container of the plurality of cleaning-gas bag containers is connected to a corresponding supply port of the plurality of supply ports, wherein the cleaning gas is different from each of the plurality of sample gases; and suctioning the cleaning gas sequentially from each of the plurality of supply ports and depressurizing each supply path such that each supply path is cleaned by the cleaning gas and depressurization.

2. The method for cleaning a gas supply unit of a gas inspection apparatus according to claim 1, wherein the cleaning gas is nitrogen gas.

* * * * *